United States Patent
Young et al.

(10) Patent No.: US 8,176,218 B2
(45) Date of Patent: May 8, 2012

(54) APPARATUS AND METHODS FOR REAL-TIME ROUTING OF RECEIVED COMMANDS IN A SPLIT-PATH ARCHITECTURE STORAGE CONTROLLER

(75) Inventors: Howard Young, Thousand Oaks, CA (US); Dante Cinco, San Diego, CA (US); Thomas P. Anderson, Encino, CA (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 12/854,720

(22) Filed: Aug. 11, 2010

(65) Prior Publication Data

US 2012/0042101 A1 Feb. 16, 2012

(51) Int. Cl.
*G06F 3/00* (2006.01)
*G06F 13/00* (2006.01)
(52) U.S. Cl. .............. 710/20; 710/5; 710/38; 711/100
(58) Field of Classification Search .............. 710/5–7, 710/20–21, 36–38; 711/100
See application file for complete search history.

(56) References Cited

U.S. PATENT DOCUMENTS

| | | | |
|---|---|---|---|
| 5,148,538 A | 9/1992 | Celtruda et al. | |
| 5,586,289 A * | 12/1996 | Chin et al. | 711/111 |
| 6,763,375 B1 * | 7/2004 | Basso et al. | 709/220 |
| 7,191,304 B1 | 3/2007 | Cameron et al. | |
| 7,330,961 B2 | 2/2008 | Sakata et al. | |
| 7,472,158 B2 * | 12/2008 | Galloway | 709/203 |
| 7,610,464 B2 | 10/2009 | Otsuka | |
| 2003/0225993 A1 | 12/2003 | Yagisawa et al. | |
| 2005/0172067 A1 | 8/2005 | Sinclair | |
| 2007/0113044 A1 | 5/2007 | Day et al. | |
| 2007/0208885 A1 | 9/2007 | Otsuka | |
| 2007/0214325 A1 | 9/2007 | Sasamoto | |
| 2008/0282047 A1 | 11/2008 | Arakawa et al. | |
| 2010/0211752 A1 | 8/2010 | Otsuka | |
| 2010/0228650 A1 * | 9/2010 | Shacham et al. | 705/34 |
| 2011/0138390 A1 * | 6/2011 | Takeuchi | 718/100 |
| 2011/0258404 A1 | 10/2011 | Arakawa et al. | |

* cited by examiner

*Primary Examiner* — Christopher B Shin
(74) *Attorney, Agent, or Firm* — Duft Bornsen & Fishman LLP

(57) ABSTRACT

Apparatus and methods for real-time routing of received frames in a split-path architecture storage controller. In one exemplary embodiment, a split-path storage controller comprises a soft-path I/O processor for processing of any received frames and comprises a fast-path I/O processor for efficient processing of common read and write command. A content parsing circuit of the storage controller parses each frame substantially concurrent with reception of the frame and selects an I/O processor for processing of an initial frame and subsequent related frames. Received frames are then routed concurrently as they are received for processing by the selected I/O processor of the multiple I/O processors of the split-path storage controller.

17 Claims, 9 Drawing Sheets

APPARATUS AND METHODS FOR REAL-TIME ROUTING OF RECEIVED COMMANDS IN A SPLIT-PATH ARCHITECTURE STORAGE CONTROLLER

BACKGROUND

1. Field of the Invention

The invention relates generally to storage controllers of storage systems and more specifically relates to apparatus and methods for routing of incoming I/O requests in a split-path architecture storage controller concurrent with reception of frames of the I/O request.

2. Related Patents

This patent is related to commonly owned U.S. patent application Ser. No. 12/854,765 filed 11 Aug. 2010 entitled APPARATUS AND METHODS FOR MANAGING EXPANDED CAPACITY OF VIRTUAL VOLUMES IN A STORAGE SYSTEM and is related to commonly owned U.S. patent application Ser. No. 12/854,800 filed 11 Aug. 2010 entitled APPARATUS AND METHODS FOR LOOK-AHEAD VIRTUAL VOLUME META-DATA PROCESSING IN A STORAGE CONTROLLER, both of which are hereby incorporated by reference.

3. Discussion of Related Art

One or more storage controllers are typically embedded within a storage system. The storage controllers are adapted to receive I/O requests from attached host systems and to process the received I/O requests to access information on physical storage devices of the storage system. In general, a storage controller comprises a general or special purpose processor and associated program memory from which stored programmed instructions are fetched and executed by the processor (CPU). The CPU is coupled with physical storage devices within, or associated with, the storage system and accesses the storage devices in accordance with the directives of the received I/O requests.

Even with the significant computational capacity of modern CPUs, overhead processing of the storage controller can impose significant latency on the processing of an I/O request. This overhead latency reduces overall throughput of the storage system in processing I/O requests. This problem is further exacerbated where the storage devices are semiconductor storage devices (e.g., so-called RAMdisks or flash memory disks) such that the mechanical latencies of rotating magnetic/optical storage devices are not present. The processing overhead of the controller may overlap mechanical latencies of traditional rotating storage devices and thus may present little or no problem. However, since semiconductor storage device present no such mechanical latencies, the processing overhead of the storage controller CPU may present a new bottleneck to storage system performance.

To reduce the overhead processing associated with common I/O requests (i.e., read and write I/O requests), some storage controllers in some storage systems have been designed according to a so-called "split-path" architecture. In such a split-path storage controller, the traditional processing of software operable on the CPU of the storage controller is a first path—i.e., a software I/O processing path or "soft-path" I/O processor. A second I/O processing component is provided as customized circuits adapted to fully process common I/O requests (e.g., read and write requests) with minimal or no processing required by the CPU of the storage controller. This second path is often referred to as a "fast-path" I/O processor in that the custom circuits are adapted to process certain common I/O requests much faster than a CPU/software processing path can ever achieve. The CPU-based I/O processing path (soft-path) may assume responsibility for less frequent, control related, I/O requests (as distinct from common read and write requests) and may perform more generalized processing for error recovery and retry of operations that fail in processing of the fast-path I/O processor. Read and write I/O requests often comprise a sequence of related frame transmissions between a host system and a storage device (through the storage controller). The storage controller must make a routing determination for each frame received to determine the appropriate I/O processor to handle each frame.

In some fast-path (i.e., split path) architecture storage controllers, the slower CPU-based I/O processing path is still involved in making routing determinations as to whether each frame of an I/O request should be processed by (i.e., routed to) the CPU (i.e., soft-path) or should be processed by the circuits of the fast-path I/O processor (i.e., fast-path). In present split-path architecture storage controllers, these routing determinations require processing within the CPU of the storage controller (fetching and executing associated instructions). Further, in some present split-path architecture controllers, each routing determination is made by the CPU after an entire frame/packet is received. Thus, even in a split-path architecture storage controller, the CPU processing may impose some degree of latency delay in the processing of common I/O requests to determine routing of the received frames to the appropriate I/O processor.

Thus, it is an ongoing challenge to reduce the overheard processing involved in routing determinations for I/O requests to be processed in a split-path storage controller.

SUMMARY

The present invention solves the above and other problems, thereby advancing the state of the useful arts, by providing methods and apparatus for determining routing of each received frame substantially concurrently with the reception of the frame. These methods and apparatus advantageously reduce the reliance on slower CPU based processing of routing determinations for received frames and thus improve overall storage system performance.

In one aspect hereof, a storage controller is provided comprising a soft-path I/O processor adapted to process any I/O request received by the storage controller. The soft-path I/O processor further comprising a programmable processor (CPU) and associated program memory coupled with the CPU for storing programmed instructions fetched and executed by the CPU to process a received I/O request. The controller also comprises a fast-path I/O processor adapted to process a subset of I/O requests received by the storage controller. The fast-path I/O processor further comprising circuits configured to process the subset of I/O requests without intervention by the soft-path I/O processor. The controller also comprises a content parsing circuit coupled with the soft-path I/O processor and coupled with the fast-path I/O processor and coupled to receive an I/O request from an initiator device coupled with the storage controller. The content parsing circuit adapted to parse an I/O request as it is received. The content parsing circuit is further adapted to selectively route the I/O request to the soft-path I/O processor or to the fast-path I/O processor based on information parsed in the I/O request. The content parsing circuit is further adapted to route the I/O request concurrently with receipt of the I/O request.

Another aspect hereof provides apparatus in a storage controller of a storage system. The storage controller comprising multiple I/O processors. The storage controller adapted to couple with an initiator device using Fibre Channel (FC) media and protocols and adapted to couple with a target device using FC media and protocols. The apparatus comprising a content addressable memory (CAM) adapted to store routing information for routing of FC frames to one of the multiple I/O processors. The CAM adapted to generate an output signal based on the routing information responsive to receipt of an input signal. The apparatus also comprises a content parsing circuit coupled with the CAM and coupled to receive an I/O request comprising a sequence of FC frames. The sequence of FC frames including an initial FCP_CMND frame followed by one or more subsequent related FC frames. The content parsing circuit adapted to generate a tag value based on information associated with an FC frame of the sequence of FC frames. The content parsing circuit further adapted to apply the generated tag value as an input signal to the CAM to locate routing information in the CAM based on the generated tag value. The apparatus also comprises a routing circuit coupled with the multiple I/O processors and coupled with the CAM. The routing circuit adapted to route an FC frame to a selected one of the multiple I/O processors based on an output signal received from the CAM. The apparatus is operable to route an FC frame to a selected one of the multiple I/O processors concurrently with reception of the FC frame.

Another aspect hereof provides a method operable in a storage controller of a storage system. The storage controller comprising multiple I/O processors and a content parsing and routing logic circuit coupled with the multiple I/O processors. The method comprising receiving, in the logic circuit, an initial frame of a sequence of related frames that comprise an I/O request and parsing, in the logic circuit, the initial frame concurrent with reception of the initial frame. The method also comprises selecting, by operation of the logic circuit, an I/O processor of the multiple I/O processors based on information parsed from the initial frame and routing, by operation of the logic circuit, the initial frame to the selected I/O processor. The method also comprises storing in a memory coupled with the logic circuit, routing information indicating that the initial frame and any subsequent frames of the sequence of related frames are routed to the selected I/O processor. The method also comprises routing, by operation of the logic circuit, subsequent frames of the sequence of related frames to the selected I/O processor based on the routing information stored in the memory and processing, by operation of the selected I/O processor, the sequence of related frames to perform the I/O request.

DETAILED DESCRIPTION OF THE DRAWINGS

Figure 1:
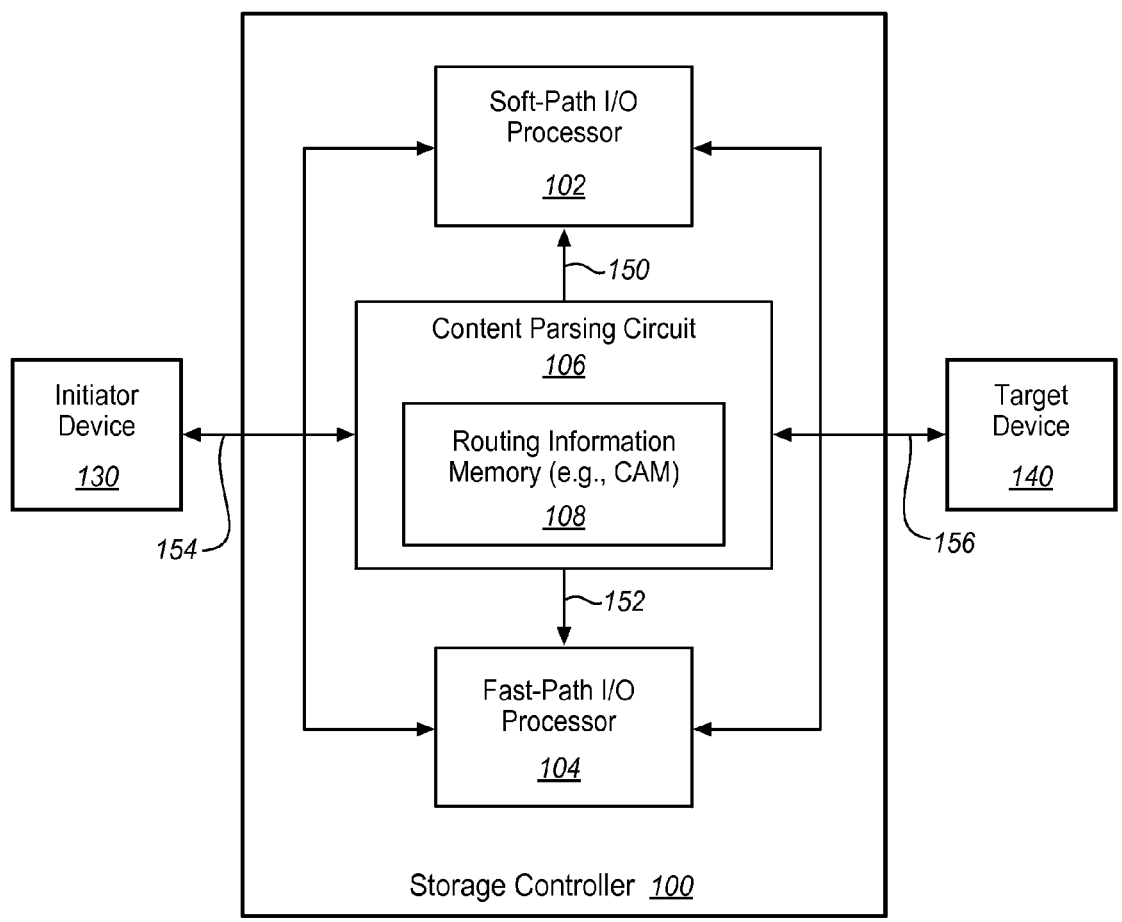
FIG. 1 is a block diagram of an exemplary storage controller enhanced in accordance with features and aspects hereof to route received frames to an appropriate one of a plurality of I/O processors in the controller concurrently as the frames are received.

FIG. 1 is a block diagram of a an exemplary storage controller 100 enhanced in accordance with features and aspects hereof to perform routing of frames to an appropriate one of a plurality of I/O processors within the controller substantially concurrently as the frames are received. Controller 100 is adapted to couple initiator device 130 with the target device 140 to permit exchange of frames between the initiator 130 and target 140. In general, initiator device 130 initiates an I/O request by transmitting an initial frame via communication path 154 to controller 100. Standard logic (not shown) within storage controller 100 determines that the I/O request is to be forwarded to target device 140 via communication path 156.

Storage controller 100 is exemplary of a so-called "split path" storage controller in that there are multiple I/O processors provided within the controller 100. I/O processor 102 and I/O processor 104 are each adapted to process I/O requests initiated by initiator device 130 and transmitted one or more related frames over communication path 154. Any number of such I/O processors may be provided within storage controller 100. In the exemplary embodiment shown in FIG. 1, I/O processor 102 is referred to as a "soft-path" I/O processor in that it comprises a general purpose (or special purpose) programmable processor (CPU) and associated program memory. The program memory stores instructions to be fetched and executed by the CPU to process an I/O request received from initiator device 130. By contrast, I/O processor 104 may be referred to as a "fast-path" I/O processor in that it comprises dedicated custom circuits adapted to rapidly process only certain I/O requests. The fast-path I/O processor 104 may be adapted to process only common read and write I/O requests directed from initiator device 130 to target device 140. While soft-path I/O processor 102 is adapted to process any type of I/O request received from initiator device 130 (i.e., read and write requests as well as any other type of I/O request), fast-path I/O processor 104 is specifically adapted to rapidly process only read and write requests so as to improve performance of the storage system in processing the most common, performance critical I/O requests.

Communication paths 154 and 156 may be any suitable communication media and protocol for coupling storage controller 100 with initiator device 130 and with target device 140. In one exemplary embodiment, Fibre Channel (FC)

communication media and protocols may be utilized for communications over paths 154 and 156.

Storage controller 100 is enhanced in accordance with features and aspects hereof by providing content parsing circuit 106 and associated routing information memory 108. Content parsing circuit 106, in conjunction with its associated routing information memory 108, is adapted to parse each received frame received on communication path 154 and to determine which I/O processor is suited to process the received frame. In general, content parsing circuit 106 analyzes information in each received frame and determines, by utilizing routing information memory 108, which of the multiple I/O processors should process the received frame. When content parsing circuit 106 determines that soft-path I/O processor 102 should be responsible for processing a received frame, an appropriate signal is generated on path 150 and applied to soft-path I/O processor 102 to cause soft-path I/O processor 102 to process the received frame. In like manner, content parsing circuit 106 generates a signal on path 152 applied to fast-path I/O processor 104 causing fast-path I/O processor 104 to process the received frame when routing information memory 108 so indicates.

Though an initiator device 103 typically initiates a new I/O request, each I/O request (in particular read and write requests) may comprise an exchange of a sequence of related frames between the initiator device 130 and the target device 140. For example, a read I/O request may comprise an initial frame indicating a request to read particular identified data from the identified target device 140. When target device 140 has the requested data ready for return to initiator device 130, subsequent data frames relating to the initial frame are transmitted from target device 140 destined for return to initiator device 130. In like manner, a write request may be initiated by an initial frame from initiator device 130 indicating that particular identified data is to be written to particular locations of target device 140. Responsive to receipt of the initial frame, target device 140 may subsequently indicated its readiness to receive the associated write data by transmitting an appropriate frame from target device 140 destined for initiator device 130. Responsive to such a ready indication, initiator device 130 may then transmit subsequent related frames containing the data to be written destined for target device 140. Where an I/O request comprises such a sequence of related frames, content parsing circuit 106 in conjunction with routing information memory 108 routes each of the frames in the sequence of related frames to an appropriate I/O processor (e.g., 102 or 104). For example, in the case of a read or write I/O request, preferably processed by fast-path I/O processor 104, content parsing circuit 106 in conjunction with its routing information memory 108 assures that each of the sequence of related frames that comprise the read or write I/O request are routed to fast-path I/O processor 104 for appropriate processing. In like manner all frames relating to other I/O requests for which fast-path I/O processor 104 is not suited are routed to soft-path I/O processor 102 by operation of content parsing circuit 106 in conjunction with its routing information memory 108.

Additional exemplary details and functions of content parsing circuit 106 and its associated routing information memory 108 are discussed further herein below. In general, content parsing circuit 106 stores information in routing information memory 108 identifying the I/O processor selected for a particular I/O request responsive to receipt of the initial frame of a sequence of related frames. As each subsequent related frame is received, content parsing circuit 106 accesses the information in routing information memory 108 to determine which of the multiple I/O processors was previously selected for processing of the I/O request that comprises the related frames. In one exemplary embodiment, routing information memory 108 may be implemented utilizing a content addressable memory (CAM).

Though FIG. 1 depicts only certain relevant elements of an enhanced storage controller, those of ordinary skill in the art will readily recognize numerous additional and equivalent components that may be present in a fully functional storage controller. Such additional and equivalent components are omitted herein for simplicity and brevity of this discussion.

Figure 2:
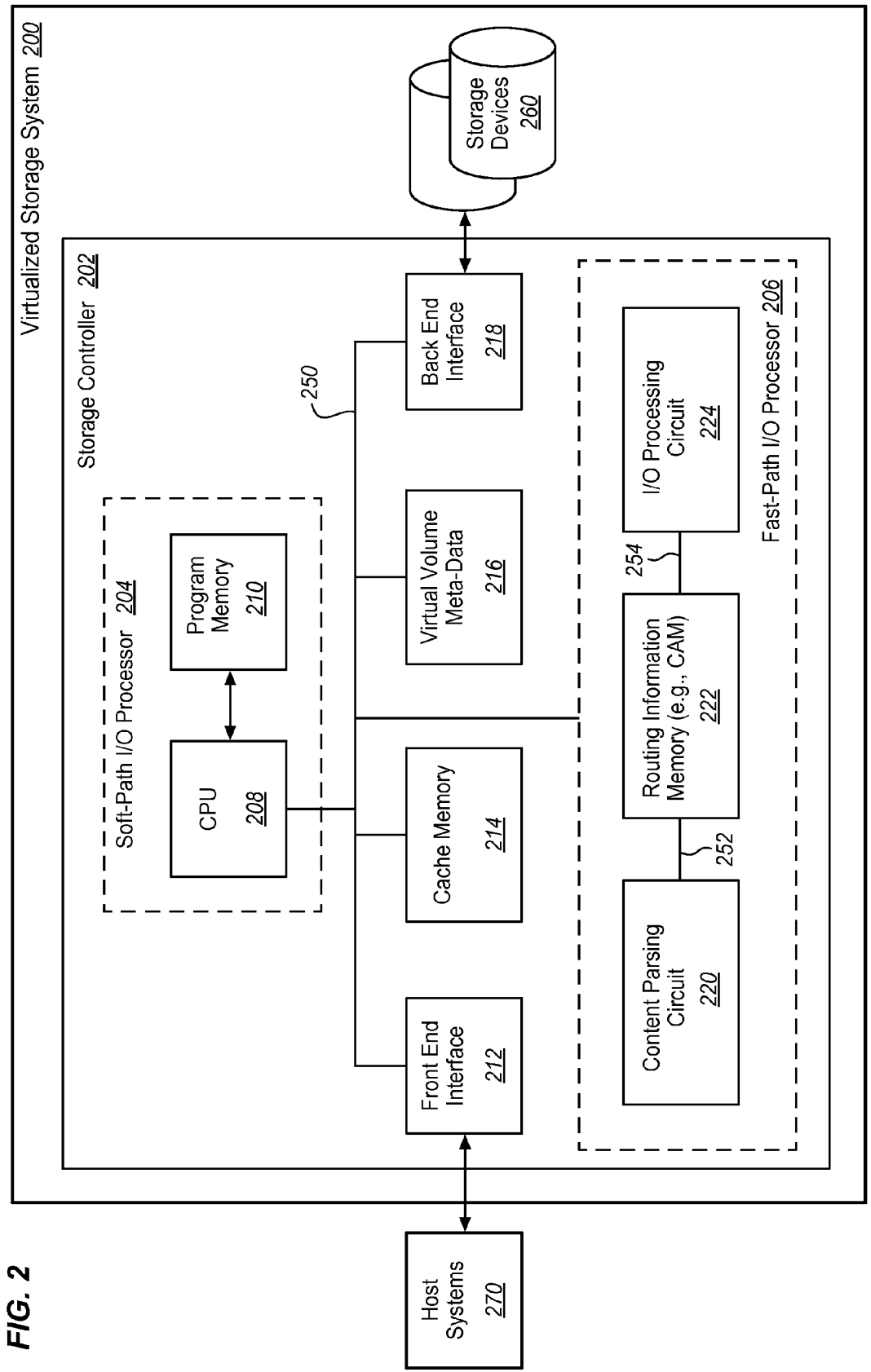
FIG. 2 is a block diagram of an exemplary storage system comprising an exemplary storage controller enhanced in accordance with features and aspects hereof to route received frames to an appropriate one of a plurality of I/O processors in the controller concurrently as the frames are received.

FIG. 2 is a block diagram of an exemplary virtualized storage system 200 comprising an enhanced storage controller 202 operable in accordance with features and aspects hereof to route frames to one of multiple I/O processors substantially concurrently as each frame is received. As above in FIG. 1, virtualized storage system 200 may receive an I/O request from attached host systems 270 directed to target devices such as storage devices 260. Storage devices 260 may be any suitable storage device for storing data on behalf of attached host systems including, for example, magnetic and optical disk drives as well as semiconductor storage devices (e.g., RAMdisks and flash memory storage devices). Storage controller 202 of system 200 includes a soft-path I/O processor 204 and a fast-path I/O processor 206. Any number of such I/O processors may be provided in such a storage system. Soft-path I/O processor 204 may comprise a general purpose CPU 208 and associated program memory 210. Soft-path I/O processor 204 therefore provides for software implementation of the storage control features of controller 202 for processing I/O request from an attached host system 270. By contrast, fast-path I/O processor 206 comprises I/O processing circuit 224 adapted to rapidly process an I/O request such as read and write requests directed between the attached host systems 270 and storage devices 260. Soft-path I/O processor 204 and fast-path I/O processor 206 may share access to a common components (212 through 218) of storage controller 202 via any suitable interconnection such as bus 250. Front-end interface 212 provides logic to adapt storage controller 202 for coupling with host systems 270 while back-end interface 218 provides logic to adapt storage controller 202 for coupling with storage devices 260. In addition, the multiple I/O processors may share access to cache memory 214 and virtual volume metadata memory 216 for access to cached data and virtual volume information, respectively, as well known in the art.

In accordance with features and aspects hereof, storage controller 202 includes content parsing circuit 220 and routing information memory 222 coupled with one another via signal path 252. As described above with respect to FIG. 1, content parsing circuit 220 and associated routing information memory 222 are adapted to parse frames received through front-end interface 212 and/or back-end interface 218. The parsing determines where each frame should be routed—i.e., routed to soft-path I/O processor 204 or routed to fast-path I/O processor 206 (and more specifically to I/O processing circuit 224 of fast-path I/O processor 206). For example, read and write I/O requests may be routed to fast-path I/O processor 206 and all other requests may be routed to soft-path I/O processor 204. Further as above in FIG. 1, content parsing circuit 220 stores information in routing information memory 222 responsive to receipt of an initial frame from a host system 270 initiating a new I/O request. Subsequent related frames are then routed by content parsing circuit 220 locating routing information in memory 222 indicating the I/O processor selected for the initial frame of the sequence of related frames.

In the exemplary embodiment of FIG. 2, content parsing circuit 220 and associated routing information memory 222 are integrated within one of the multiple I/O processors—specifically for example in fast-path I/O processor 206. In such an embodiment, routing information located in memory 222 by circuit 220 is applied via path 254 to I/O processing circuit 224 of fast-path I/O processor 206. Circuit 224 then determines whether the routing information indicates that the fast-path I/O processor 206 or the soft-path I/O processor 204 is selected to process the received frame. If the frame is to be routed to the fast-path I/O processor 206, circuit 224 completes processing the received frame. Otherwise, circuit 224 signals soft-path I/O processor 204 (e.g., via path 250) that it should process the received frame.

Though FIG. 2 depicts only certain relevant elements of an enhanced storage controller, those of ordinary skill in the art will readily recognize numerous additional and equivalent components that may be present in a fully functional storage controller. Such additional and equivalent components are omitted herein for simplicity and brevity of this discussion.

Figure 3:
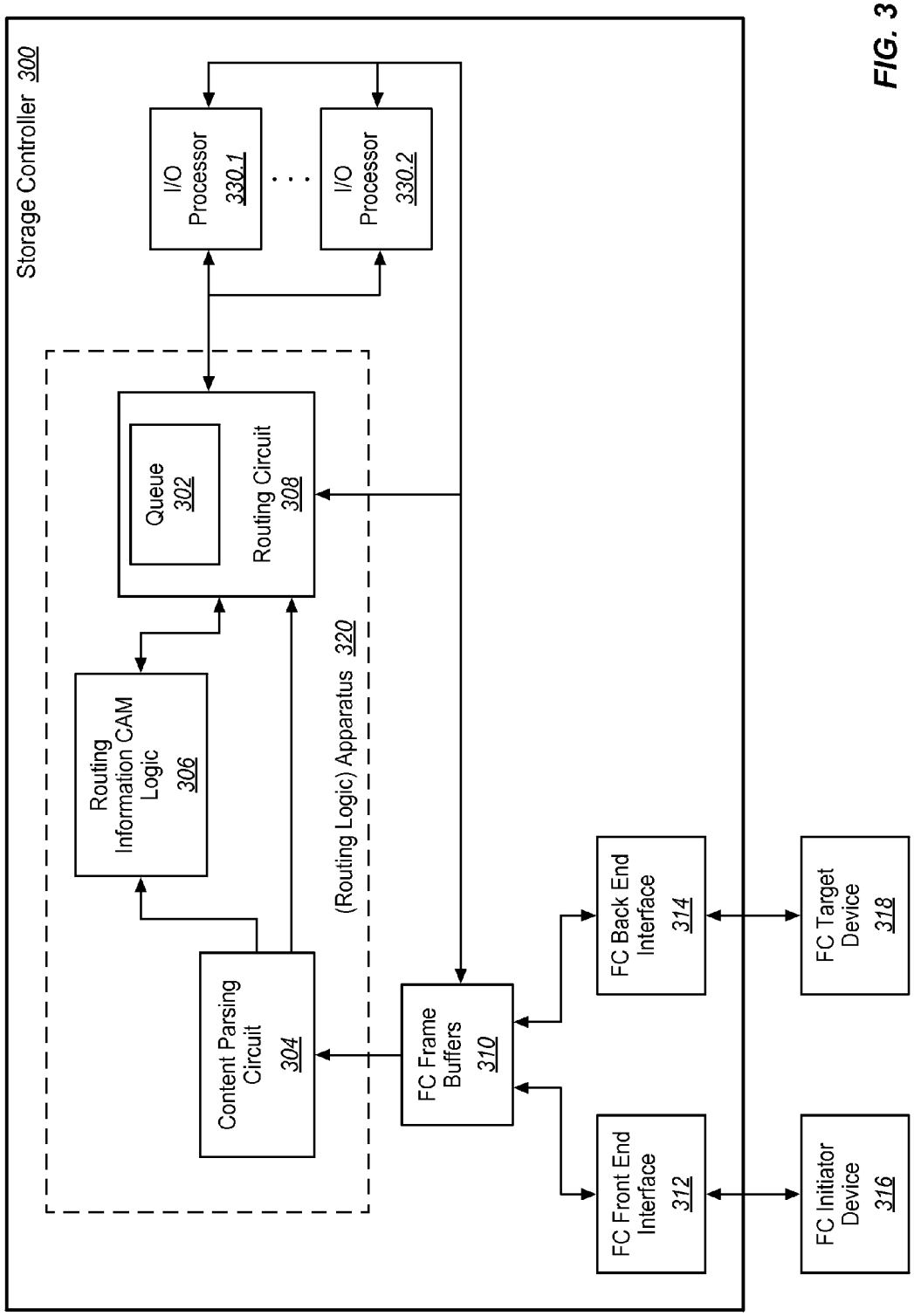
FIG. 3 is a block diagram of an exemplary storage controller comprising exemplary apparatus providing features and aspects hereof to route received frames to an appropriate one of a plurality of I/O processors in the controller as the frames are received.

FIG. 3 is a block diagram describing another exemplary embodiment of an enhanced storage controller 300 providing features and aspects hereof to route received frames to one of a plurality of I/O processors of the storage controller 300. Storage controller 300 of FIG. 3 represents an exemplary embodiment of the enhanced storage controller including apparatus 320 ("routing logic") specifically adapted for Fibre Channel (FC) communications with host systems and storage devices. Controller 300 comprises multiple I/O processors 330.1 through 330.2. Any number of I/O processors may be provided in an enhanced storage controller 300. One or more of the plurality of I/O processors 330.1 through 330.2 may be implemented as a fast-path I/O processor as described above in FIGS. 1 and 2 Likewise, one or more of the plurality of I/O processors 330.1 through 330.2 may be implemented as a soft-path I/O processor as described above in FIGS. 1 and 2.

Storage controller 300 includes FC front-end interface 312 for coupling storage controller 300 with one or more FC initiator devices 316 (e.g., host systems) and further includes FC back-end interface 314 for coupling storage controller 300 with one or more FC target devices 318 (e.g., storage devices). As each frame is received from an initiator 316 or target 318 through a corresponding interface 312 or 314, respectively, the frame is stored into one of a plurality of FC frame buffers 310. FC frame buffers 310 may be any suitable memory component adapted for storing FC frame buffers received from initiator or target devices. Received frames in FC frame buffers 310 may be accessed by any of the I/O processors 330.1 through 330.2 for processing of the underlying I/O request represented by one or more such received frames.

Apparatus 320 ("routing logic") of storage controller 300 comprises content parsing circuit 304, an associated routing information CAM logic 306, routing circuit 308, and queue 302. Content parsing circuit 304 parses each received FC frame concurrently with reception and storage of the frame. By parsing information of each frame, content parsing circuit 304 determines whether the received frame is an initial frame of a sequence of related FC frames representing an I/O request. If so, content parsing circuit 304 stores routing information in routing information CAM logic 306 indicating receipt of an initial frame of a sequence of related frames. The routing information generated and stored in CAM logic 306 may comprise a tag value encoding information regarding the type of FC frame received as well as addressing and/or port identification information regarding the source and destination of the received frame (e.g., the I_T nexus for the frame). The tag information so generated may be analyzed by routing circuit 308 by accessing CAM logic 306 to determine which of the multiple I/O processors 330.1 through 330.2 is appropriately suited to process the received frame. The routing information determined by routing circuit 308 may be entered in queue 302 along with information identifying the particular frame in frame buffers 310 associated with the routing information. Frame identification information and associated routing information stored in queue 302 may be accessed by routing circuit 308 when an I/O processor 330.1 through 330.2 is ready for processing of a next frame.

Though FIG. 3 depicts only certain relevant elements of an enhanced storage controller, those of ordinary skill in the art will readily recognize numerous additional and equivalent components that may be present in a fully functional storage controller. Such additional and equivalent components are omitted herein for simplicity and brevity of this discussion.

Figure 9:
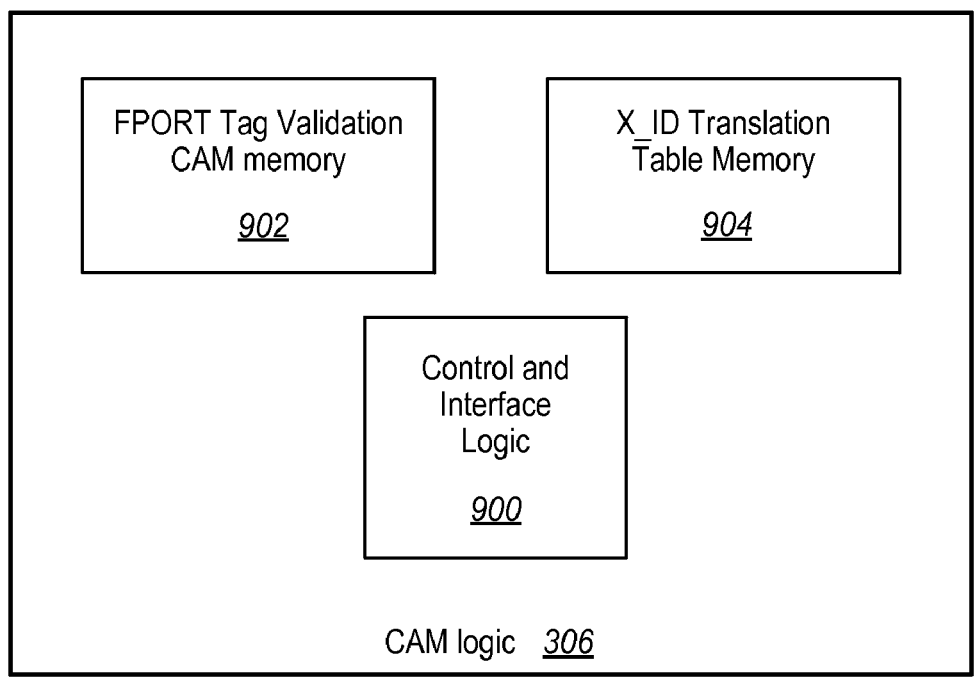
FIG. 9 is a block diagram providing exemplary additional details of the structure of the CAM logic of FIGS. 3 and 4.

FIG. 9 depicts additional exemplary detail of the structure of CAM logic 306 of FIG. 3. CAM logic 306 may include control and interface logic 900 adapted to couple CAM logic 306 to other elements of the routing circuits and apparatus of FIG. 3. Logic 900 further provides logic to operate CAM logic 306 to locate routing information in memories 902 and 904. CAM memory 902 may comprise a content addressable memory circuit used to validate FPORT tag values applied to logic 306. An FPORT tag value (discussed further below) identifies the I_T nexus associated with an FC frame being received (e.g., the source and destination device IDs and an FC port number associated with the received frame). The possible valid connections between known FC initiator devices and known FC target devices (and the associated FC port numbers) may be pre-loaded in CAM memory 902 to indicate all known, valid couplings between devices in the enterprise. When an FPORT tag is received by CAM logic 306 (via logic 900), control and interface logic 900 applies the tag value to CAM memory 902 to confirm that the received frame associated with the FPORT tag value is associated with a known I_T nexus of the storage system.

As a new I/O request is received, the originator exchange ID (OX_ID) and virtual address information associated with the received new I/O request may be entered in X_ID translation table memory 904. This table provides a mapping between the virtual addressing information and the physical addressing information for a virtual volume to be accessed by a new I/O request. The mapping of virtual and physical addressing information may be indexed based on X_ID values of the received FC frame. An FPORT X_ID tag value (discussed further below) may also be applied to CAM logic 306 (via logic 900). Responsive to receipt of an FPORT X_ID tag value, logic 900 first validates the FPORT tag portion of the FPORT X_ID tag value by applying it to CAM memory 902. If valid, control logic 900 then locates an appropriate entry in translation table memory 904 to map between the physical and virtual addresses based on the X_ID value in the received FC frame. When the frame is from a target device, the mapping information located in memory 904 is used to map the physical addressing information to corresponding virtual addressing information and a corresponding X_ID used by the initiator (OX_ID). Conversely, when the frame is from an initiator device, the mapping information located in memory 904 is used to map the virtual addressing information to corresponding physical addressing information and a corresponding X_ID used by the target (RX_ID).

Those of ordinary skill in the art will readily recognize suitable logic circuits and memory circuits to implement a fully functional CAM logic 306. Details of such suitable logic are omitted herein for simplicity and brevity of this discussion.

Figure 4:
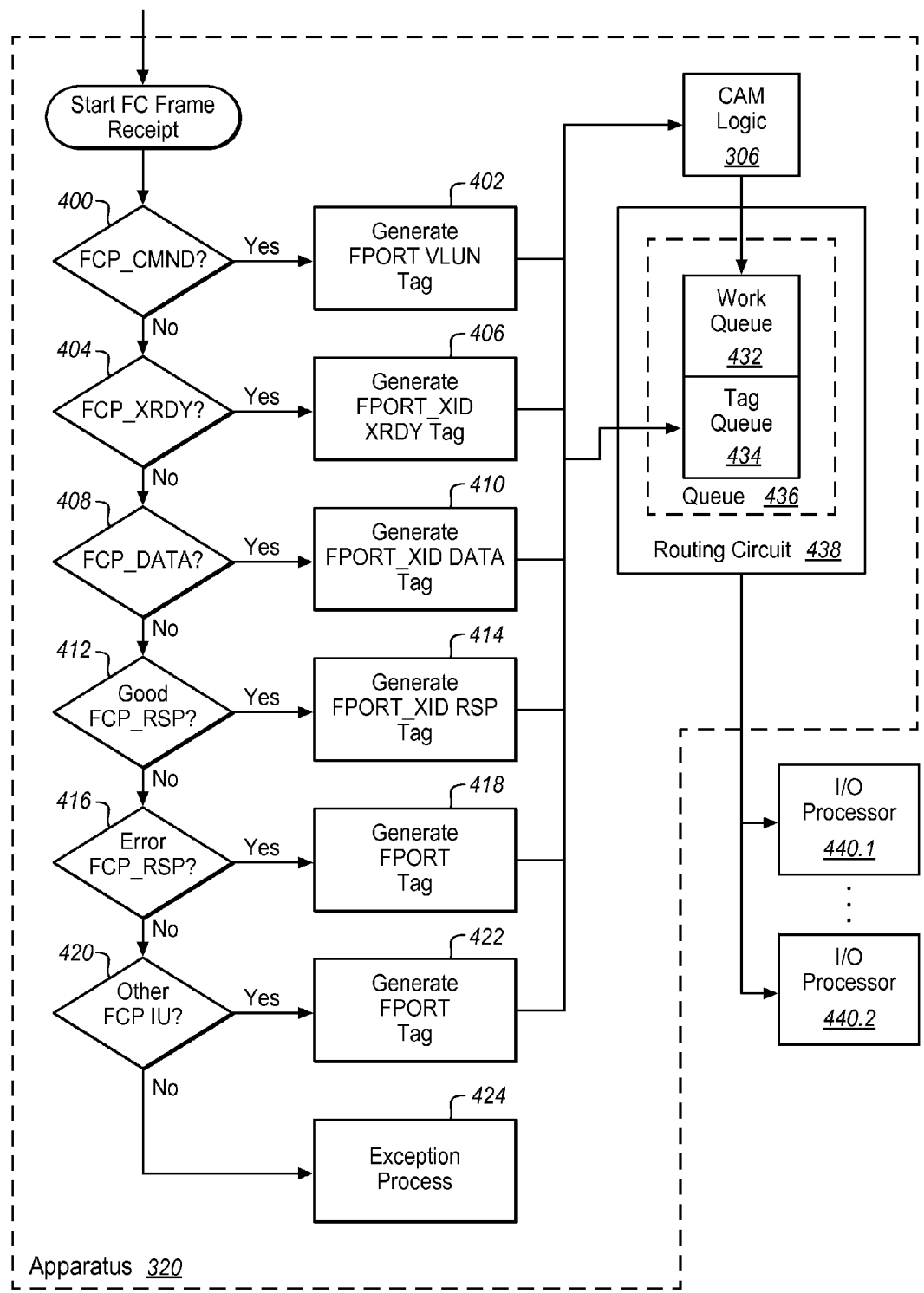
FIG. 4 is a block diagram of an exemplary embodiment of the routing logic apparatus of the enhanced storage controller of FIG. 3

FIG. 4 is a block diagram providing additional details of an exemplary embodiment of apparatus 320 ("routing logic") of FIG. 3. Apparatus 320 of FIG. 4 is operable responsive to receipt of an FC frame from an initiator or target device coupled to the controller. In general, elements 400 through 424 parse information in the FC frame concurrent with reception of the FC frame to determine how the frame should be routed to one of the multiple I/O processors 440.1 through 440.2. Any number of I/O processors may be coupled with apparatus 320. The exemplary embodiment shown in FIG. 4 presumes that one of the I/O processors is a so-called "soft-path" I/O processor (i.e., a CPU with associated program memory comprising program instructions intended to process any received I/O request). The exemplary embodiment of FIG. 4 further presumes at least one "fast-path" I/O processor adapted to rapidly process common requests such as read and write requests that are processed without error. Logic element 400 tests whether the frame is an FCP_CMND type of frame. If so, element 402 generates an FPORT VLUN tag indicating receipt of an initial frame representing a command portion of an I/O request. Exemplary formats and use of this and other generated tag values is discussed further herein below with reference to FIG. 5. In general, the FPORT VLUN tag value associates an exchange ID value (X_ID) of a newly received request (e.g., from the FCP_CMND frame) with the I_T nexus of the newly received request (i.e., source and destination addresses and port numbers). Thus, subsequent frames associated with completion of the new request may be associated with the original request based on the I_T nexus and the X_ID value associated in the CAM entries by the newly added information from the FPORT VLUN tag value.

If element 400 determines that the frame being received is not an FCP_CMND frame, element 404 next determines whether the received frame is an FCP_XRDY type of frame. If so, element 406 generates an FPORT X_ID XRDY tag value. In general, an FPORT X_ID XRDY tag value will be used to associate the XRDY frame transmission with the original underlying write request through the CAM. By so associating the XRDY frame with the original write request, the XRDY frame may be routed to the same I/O processor as the write request—e.g., to the fast-path I/O processor. Otherwise, if element 408 determines that the received FC frame is an FCP_DATA frame, element 410 generates an FPORT X_ID DATA tag value. In general, an FPORT X_ID DATA tag value will be used to associate the DATA frame transmission with the original underlying read request through the CAM. By so associating the DATA frame with the original read request, the DATA frame may be routed to the same I/O processor as the read request—e.g., to the fast-path I/O processor. Otherwise, if element 412 determines that the received frame is an FCP_RSP type frame indicating a good response status, element 414 generates an FPORT X_ID RSP tag value. In general, an FPORT X_ID RSP tag value will be used to associate the RSP frame transmission indicating a good status with the original underlying read or write request through the CAM. By so associating the RSP frame with the original read or write request, the RSP frame may be routed to the same I/O processor as the write request—e.g., to the fast-path I/O processor. Otherwise, if element 416 determines that the received frame is an FCP_RSP type frame indicating an error or other anomalous status, element 418 generates an FPORT tag value. In general, an FPORT tag value will be used to associate the RSP frame transmission indicating an error or other anomalous status with the original underlying request through the CAM. This tag value will force the error or anomalous status to be routed for processing by the soft-path I/O processor for error or other recovery processing not handled by the fast-path I/O processor. Otherwise, if element 420 determines that the FC frame is any other type of FCP_IU frame, element 422 generates an appropriate FPORT tag value. Otherwise, element 424 represents appropriate exception or error processing to signal an unknown type of frame being received.

The tag values generated by element 402, 406, 410, 414, 418, and 422 are applied as input to CAM logic 306 to perform a lookup and locate an associated entry containing routing related information. In general, the FPORT VLUN tag generated by element 402 may be used to initially store a new entry in CAM logic 306 in that the FCP_CMND frame represented FPORT VLUN tag value indicates an initial frame of a new I/O request. The new I/O request may include a sequence of frames comprising the initial frame and subsequent related frames of the sequence that, in combination, represent the entire I/O request. Thus, the FCP_CMND frame generates a new tag value and routing information to be entered in CAM logic 306. In particular, in one exemplary embodiment, an exchange ID (X_ID) associated with the newly received initial frame (FCP_CMND frame) of an I/O request may be stored in a newly created entry of CAM logic 306. As subsequent frames of a sequence of related frames representing an I/O request are received (e.g., an FCP_XRDY frame, an FCP_DATA frame, or an FCP_RSP frame), the FPORT X_ID tag values generated by element 406, 410, and 414, respectively, are applied as input to CAM logic 306 to locate an entry within CAM logic 306 having an associated X_ID value corresponding to the X_ID associated with the initial frame of the sequence of related frames.

When a new FPORT VLUN tag is applied as an input to CAM logic 306, the generated output is the X_ID value associated with the newly received initial frame of a new I/O request. When an FPORT X_ID tag value for the FCP_XRDY frame, FCP_DATA frame, or FCP_RSP frame is applied to CAM logic 306, the output of the CAM logic 306 comprises the X_ID value associated with the initial frame of the sequence of related frames that represent the I/O request. The output X_IDs from CAM logic 306 are applied to queue 436. In addition, the corresponding tag values generated by elements 402 through 422 may also be applied to queue 436 along with any other information suitable for recording information regarding the received frame and routing thereof. In one exemplary embodiment, queue 436 may comprise multiple parallel queue structures (e.g., FIFO circuits) such that a work queue 432 may store the X_ID values generated by CAM logic 306 and a tag queue 434 may store the corresponding tag values that generated the stored X_ID values. Still other information may be stored in the parallel queue structures of queue 436 including, for example, identification information indicating where in the plurality of frame buffers the received frame is stored. These and other parallel queue structures may store all information necessary to select an appropriate I/O processor for processing the frame or frames that comprise an I/O request.

Routing circuit 438 may then retrieve entries from queue 436 to select an appropriate I/O processor (440.1 through 440.2) for processing of the frame or frames that comprise an I/O request. For example, where a new I/O request comprises and initial FCP_CMND frame indicating a read or write command, a fast-path I/O processor may be selected by routing circuit 438 to process the sequence of related frames that comprise the I/O request. Or, for example, where the initial frame indicates that the I/O request is other than a read or write request, routing circuit 438 may select a soft-path I/O processor to process the frame or frames that comprise the I/O request.

Further, routing circuit is adapted to parse response frames (FCP_RSP) within a sequence of related frames that comprise an I/O request. Where a response frame indicates an anomalous status conditions (e.g., any status other than a successful completion) and the I/O request was previously routed to a fast-path I/O processor, routing circuit may update information in the queue 436 and CAM logic 306 so indicate that the response frame and other subsequent frames of the sequence related frame may be routed to a soft-path I/O processor. The soft-path I/O processor is adapted to process any required error conditions and any appropriate retries or other error recovery while a fast-path I/O processor may be adapted only to handle standard, error-free exchanges of data between the initiator and target devices.

Sill further, in some embodiments, routing circuit 438, and/or CAM logic 306, and/or the entirety of routing logic apparatus 320 may be integrated within one of the I/O processors (440.1 through 440.2). For example, a fast-path I/O processor that comprises custom logic circuits for processing read and write I/O requests may include the custom circuits for implementing routing logic 320. Thus, initial routing of a frame or frames to a soft-path I/O processor may be performed by logic within a fast-path I/O processor. In like manner, re-routing of a sequence of related frames from a fast-path I/O processor to a soft-path I/O processor responsive to parsing information in a response frame indicating an anomalous condition may also be performed within the fast-path I/O processor.

Though FIG. 4 depicts only certain relevant elements of routing logic in an enhanced storage controller, those of ordinary skill in the art will readily recognize numerous additional and equivalent components that may be present in a fully functional storage controller. Such additional and equivalent components are omitted herein for simplicity and brevity of this discussion.

Figure 5:
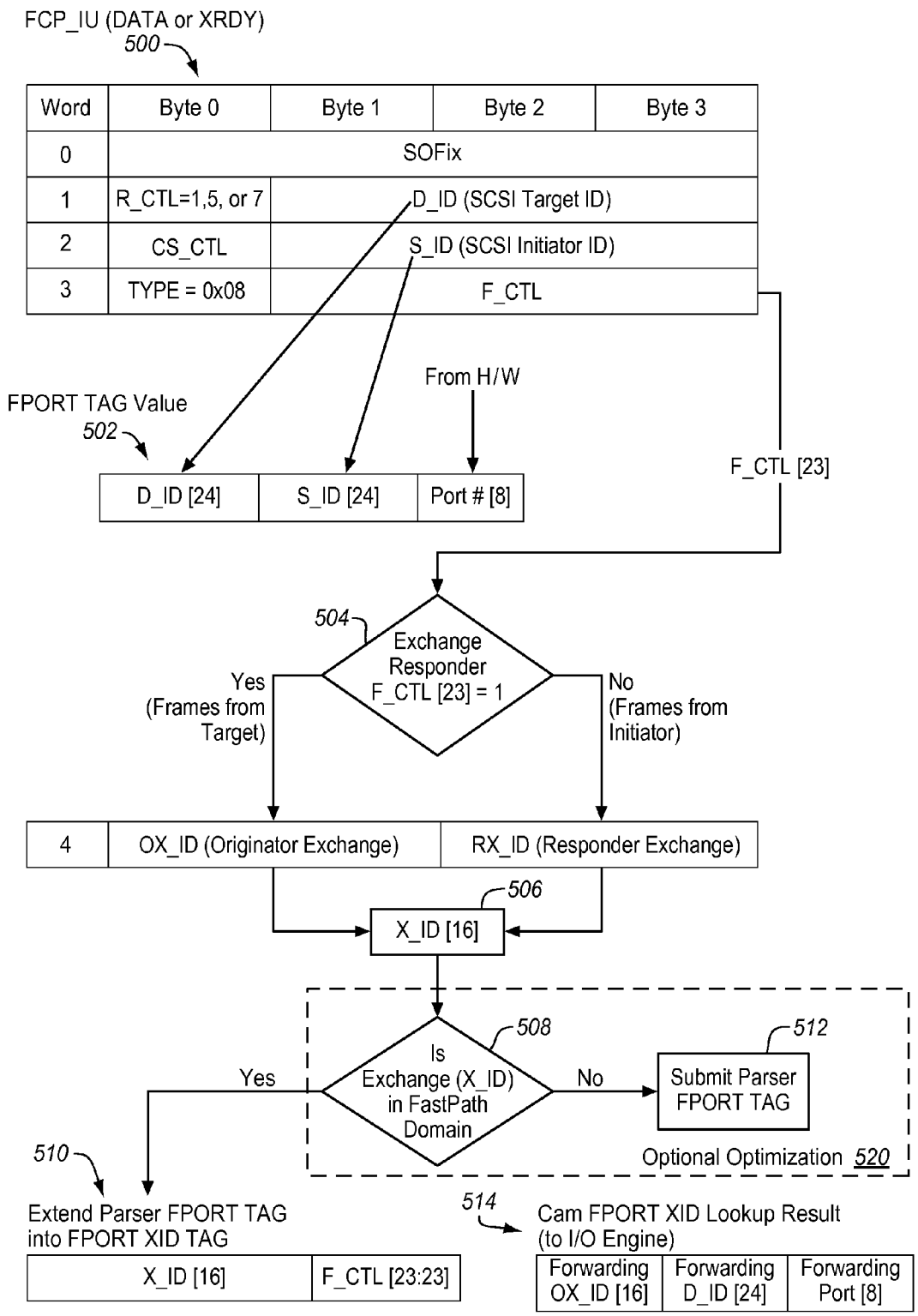
FIG. 5 is a block diagram describing exemplary data and processing used in an enhanced storage controller to determine, in accordance with features and aspects hereof, appropriate routing of received frames to an appropriate one of a plurality of I/O processors in the controller as the frames are received.
Figure 8:
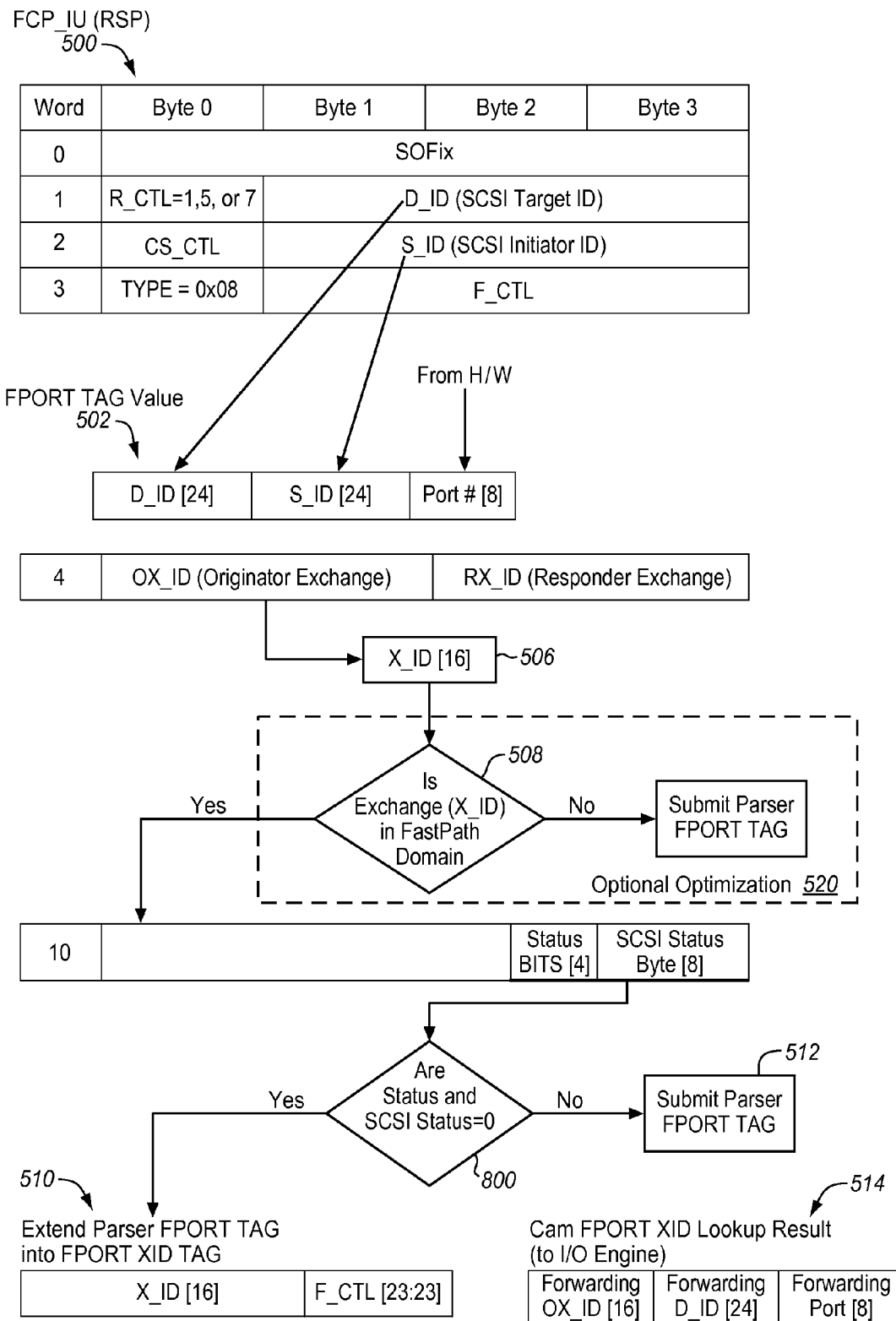
FIG. 8 is a block diagram describing exemplary data and processing used in an enhanced storage controller to determine, in accordance with features and aspects hereof, appropriate routing of received frames to an appropriate one of a plurality of I/O processors in the controller as the frames are received.

FIGS. 5 and 8 are block diagrams describing the generation of tag values and use of the tag values to generate and utilize routing information for use by routing logic in an enhanced storage controller to route FC frames to one of a plurality of I/O processors in the storage controller. FIG. 5 exemplifies generation of tag values as described above in FIG. 4 by way of data flow and related logic elements. Based on information in a received FCP_IU 500 (e.g., an FCP_XRDY or FCP_DATA), logic of the parsing circuit determines information to generate an FPORT tag value 502. The FPORT tag value 502 may comprise the source and destination IDs extracted from words 1 and 2 of the FCP_IU as well as an FC port number (from the FC physical layer logic circuits). The FPORT tag value may then be applied (not shown) to CAM logic (306 of FIG. 3) to validate that the FC frame is from a known I_T nexus of the enterprise. Presuming in this figure that the FPORT tag value indicates that the I_T nexus is known (and hence valid), logic element 504 then determines whether the FCP_IU is from a target device or from an initiator device so as to select the appropriate exchange ID (X_ID) 506 from word 4 of the FCP_IU. The X_ID extracted from the FCP_IU and other information may then be used to generate an FPORT X_ID tag value 510. The FPORT X_ID tag value 510 is then applied to CAM logic (306 of FIG. 3) to translate the X_ID and addressing information into corresponding values to be used according to the logical/physical mapping function of CAM logic (306 of FIG. 3). The output 514 of the CAM logic translation may comprise a forwarding OX_ID (i.e., the X_ID of the device to which the frame is directed) and a forwarding device ID and port. This and other information may then be entered in a work queue (e.g., 302 of FIG. 3) for other routing logic to determine the I/O processor suited to handle the frame (i.e., the I/O processor handling all of the sequence of related frames of an I/O request).

In one exemplary embodiment, the parsing circuit may optionally bypass the lookup in the CAM logic to translate the virtual/physical addressing and X_ID values for forwarding a frame. Rather as indicated by optional processing 520, logic 508 may determine that the frame is intended to be processed by one or another I/O processor based on the X_ID value. For example, a range of X_ID values may be reserved to be used only by an I/O processor corresponding to the range. Thus, by inspection of only the X_ID value in a received frame (the OX_ID or the RX_ID depending on which direction the frame is transmitting), logic 508 may determine without reference to the translation memory of CAM logic 306 (of FIG. 3) that the frame is to be routed to the soft-path I/O processor. In such a case, the FPORT tag (generated as value 502) may be directly entered into the work queue for eventual routing to the soft-path I/O processor. In other words, the soft-path I/O processor will use other existing mechanisms to perform any required translation of addressing information and the automated address translation of the CAM logic may be reserved only for use when the fast-path I/O processor will later process the received frame.

FIG. 8 is similar to FIG. 5 but depicts the processing of an FCP_IU response frame (FCP_RSP frame). Since the response frame is known to originate from the target device, logic may simply select the OX_ID of the initiator device) as the X_ID 506 to be used. In like manner to FIG. 5, optional logic 520 may bypass any address translation if it can be determined (from the range of the X_ID 506) that the soft-path processor is to process the received response frame. Otherwise, logic 800 determines from inspection of the SCSI status in word 10 of the frame whether the response indicate a failure (or any other non-successful anomalous condition). If any such error or other anomaly is detected in the SCSI status, the FPORT tag value may be directly used (in the work queue) to permit the frame to be routed to the soft-path I/O processor for retry or error processing. Otherwise, an FPORT X_ID tag value 510 is generated as in FIG. 5 and applied to CAM logic to generate the lookup result 514 to be entered in the work queue for routing to the appropriate I/O processor.

Figure 6:
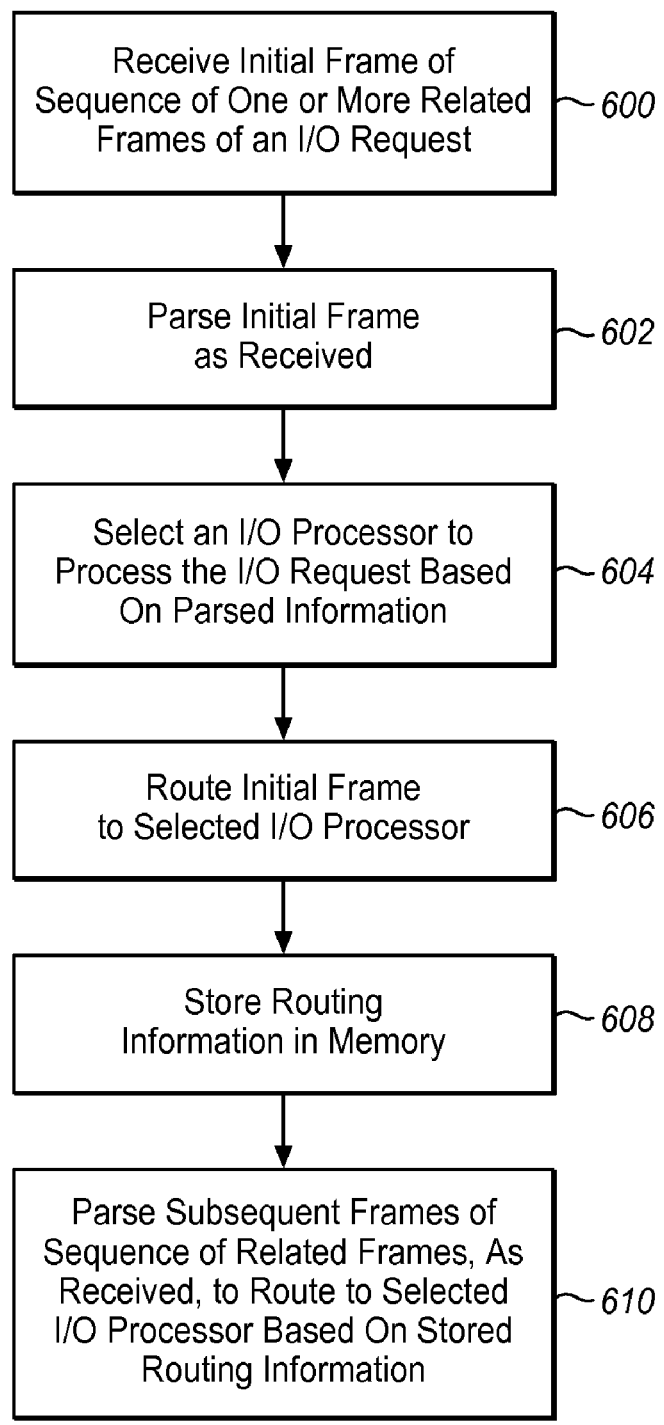
FIGS. 6 and 7 are flowcharts describing exemplary methods in accordance with features and aspects hereof to route received frames to an appropriate one of a plurality of I/O processors in a storage controller as the frames are received.

FIG. 6 is a flowchart describing an exemplary method in accordance with features and aspects hereof to provide routing of frames to one of multiple I/O processors in a storage controller concurrently with receipt of each frame. The method of FIG. 6 may be operable within an enhanced storage controller such as described in FIGS. 1, 2, and 3 and more specifically may be performed by routing logic circuits such as described above with reference to FIGS. 3 and 4. Step 600 represents receipt of an initial frame of a sequence of one or more related frames representing an I/O request. Substantially concurrently with receipt of the initial frame, step 602 parses the initial frame to identify the type of frame and type of I/O request specified by the initial frame. At step 604 an appropriate I/O processor is selected to process the I/O request indicate by the received initial frame based on the information parsed as the frame is received. For example, read and write I/O requests may be routed to a fast-path I/O processor specifically adapted to efficiently process read and write I/O requests between an initiator and target device. Other I/O requests as well as frames relating to error recovery may be routed to a soft-path I/O processor adapted to handle any kind of exchange between the target initiator and target devices. Based on the selection of step 604, the initial frame is routed to the selected I/O processor at step 606. At step 608, information regarding routing of the initial frame to a selected I/O processor is stored in a memory. The stored information is then used to route related subsequent frames to the same selected I/O processor. Step 610 then represents continued processing to receive and parse subsequent frames of a sequence of related frames that include the previously routed initial frame and that collectively comprise processing of an I/O request. Each subsequent frame is also parsed substantially concurrently as it is received and is routed to the same selected I/O processor based on the routing information stored in the memory by step 608. The method of FIG. 6 is repeated for each initial frame received from an initiator device initiating a new I/O request.

Figure 7:
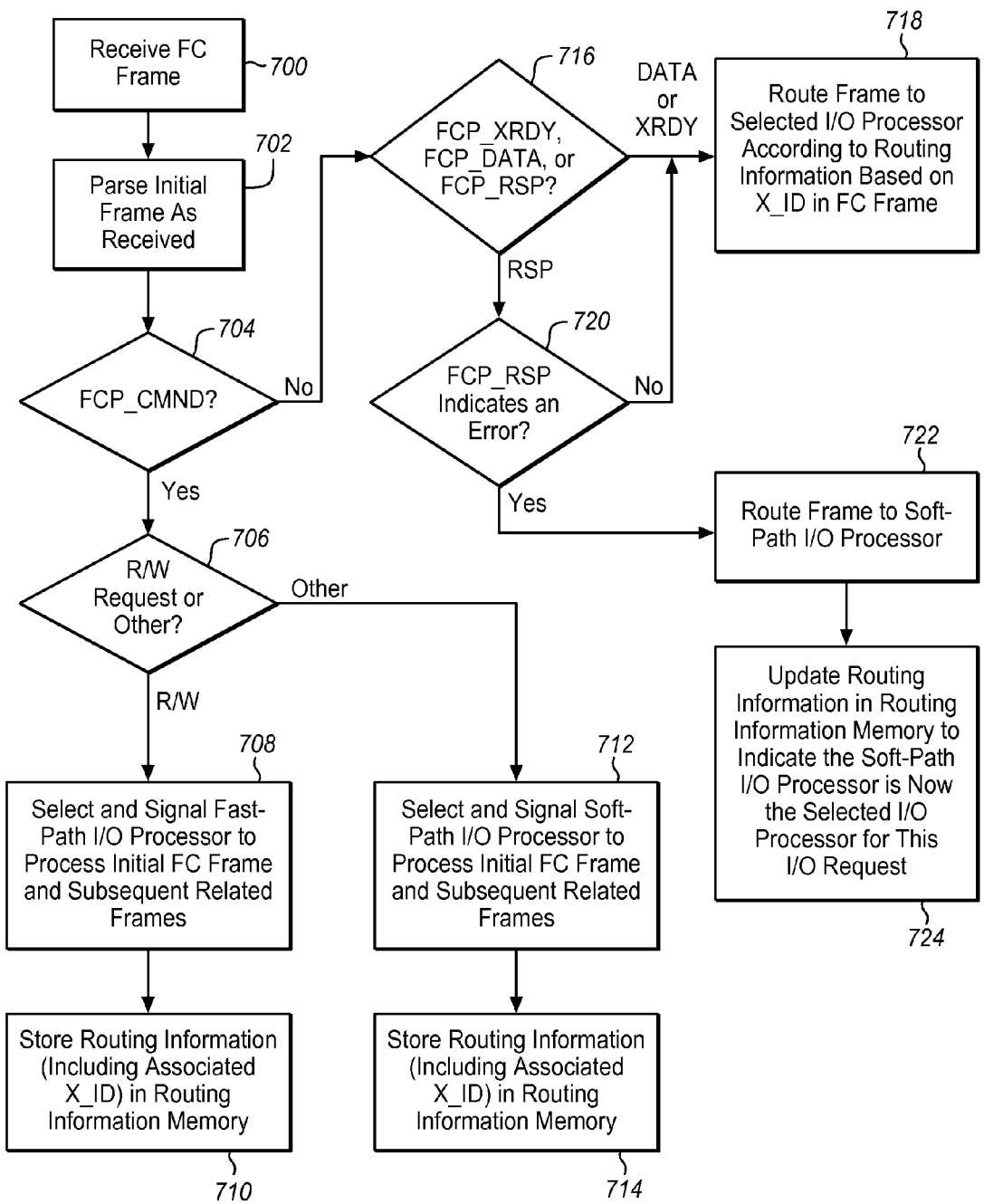

FIG. 7 is a flowchart describing another exemplary method in accordance with features and aspects hereof to improve efficiency of routing of received FC frames to one of a plurality of the I/O processors within an FC storage controller. The method of FIG. 7 may be operable within an enhanced storage controller such as described in FIGS. 1, 2, and 3 and more specifically may be performed by routing logic circuits such as described above with reference to FIGS. 3 and 4. The method of FIG. 7 represents processing of one FC frame as it is received and is repeated for each received FC frame. Step 700 represents receipt of an FC frame of a sequence of one or more related FC frames that, in combination, comprise an I/O request. The I/O request received from an FC initiator device directed to an identified FC target device coupled with the storage controller. Step 702 parses the FC frame substantially concurrently with its receipt. The parsing extracts information identifying the FC initiator device and FC target device (e.g., the I_T nexus) as well as the type of frame and/or type of I/O request represented by the FC frame. Step 704 determines whether the FC frame represents an FCP_CMND command frame (e.g., the initial frame of a sequence of one or more related FC frames that comprise an I/O request). If so, step 706 determines whether the FCP_CMND frame (representing an initial frame of a new I/O request) represents a read or write request or some other form of I/O request. If the FCP_CMND frame indicates a read or write request, step 708 selects and signals the fast-path I/O processor of the storage controller to process the initial FC frame. The initial frame is thus routed to the selected fast-path I/O processor. The fast-path I/O processor is also selected to process subsequent related frames associated with the read or write command. Thus, routing information identifies the fast-path I/O processor as selected for processing the sequence of related FC frames that comprise the read or write I/O request. Step 710 then stores the routing information in the routing information memory (e.g., a CAM) indicating that the fast-path I/O processor has been selected for processing of this read or write I/O request. Thus, the initial FC frame and all subsequent related FC frames of the sequence will be routed to the selected fast-path I/O processor. Conversely, if step 706 determines that the FCP_CMND of the initial FC frame indicates some other I/O request, step 712 selects and signals the soft-path I/O processor to process the received initial FC frame and any subsequent related frames of sequence. Step 714 then stores the routing information in the routing information memory indicating that this initial FC frame and any subsequent related FC frames of the sequence are to be routed to and processed by the soft-path I/O processor. The information stored in the routing information memory by step 710 and 714 may include information associating the X_ID identified in the received FCP_CMND frame with this initial FC frame and hence with any subsequent related FC per frames of the sequence.

If step 704 determines that the received frame is not an FCP_CMND frame, step 716 determines whether the received frame is an FCP_XRDY frame, an FCP_DATA frame, or an FCP_RSP frame. Such frames represent other FC frames of a sequence of related frames associated with an I/O request such as a read or write I/O request. If step 716 determines that the received frame is either an FCP_XRDY or FCP_DATA frame, step 718 determines from the routing information in the routing information memory which I/O processor has been previously selected to process the sequence of related frames for this I/O request. Typically, such subsequent frames of a read or write I/O request will be routed to the selected fast-path I/O processor determined upon receipt of the initial FCP_CMND frame of the sequence of related frames. The X_ID associated with the initial FCP_CMND frame in the routing information memory may be used to associate the subsequent FCP_XRDY AND FCP_DATA frames with the original FCP_CMND frame to identify the selected I/O processor.

If the FC frame is not an FCP_XRDY or FCP_DATA frame, but rather an FCP_RSP frame, step 720 determines whether the response information in the FCP_RSP frame indicates an error or other anomalous condition in the processing of the related I/O request. If the response indicates no error, the FCP_RSP frame is routed to the selected I/O processor as above by step 718. If the response indicates some error or anomalous condition, step 722 routes the response frame to the soft-path I/O processor where error processing and recovery may be appropriately handled. Step 724 then updates the routing information in the routing information memory to indicate that the soft-path I/O processor is now the selected I/O processor for all subsequent related FC frames for this I/O request. Thus, the routing of all subsequent I/O frames may be altered from the fast-path I/O processor to the soft-path I/O processor responsive to detecting an error condition (or other anomalous condition) in processing of the underlying I/O request.

Those of ordinary skill in the art will readily recognize numerous additional and equivalents steps in the methods of FIGS. 6 and 7 in a fully functional storage controller. Such additional and equivalents steps are well known to those of ordinary skill in the art and are omitted herein for simplicity and brevity of this discussion.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A storage controller adapted for processing I/O requests, the storage controller comprising:
 a soft-path I/O processor adapted to process any I/O request received by the storage controller, the soft-path I/O processor further comprising a programmable processor (CPU) and associated program memory coupled with the CPU for storing programmed instructions fetched and executed by the CPU to process a received I/O request;
 a fast-path I/O processor adapted to process a subset of I/O requests received by the storage controller, the fast-path I/O processor further comprising circuits configured to process the subset of I/O requests without intervention by the soft-path I/O processor; and a content parsing circuit coupled with the soft-path I/O processor and coupled with the fast-path I/O processor and coupled to receive an I/O request from an initiator device coupled with the storage controller, the content parsing circuit adapted to parse an I/O request as it is received, wherein the content parsing circuit is further adapted to selectively route the I/O request to the soft-path I/O processor or to the fast-path I/O processor based on information parsed in the I/O request, wherein the content parsing circuit is further adapted to route the I/O request concurrently with receipt of the I/O request.

2. The storage controller of claim 1
wherein an I/O request comprises a sequence of related frames exchanged through the storage controller between the initiator device and a target device identified by the I/O request,
wherein the controller further comprises:
a memory, coupled with the content parsing circuit, for storing routing information relating to the I/O request, and
wherein the content parsing circuit is further adapted to route each frame of the sequence of related frames based on information in the memory.

3. The storage controller of claim 2
wherein the memory is a content addressable memory (CAM).

4. The storage controller of claim 2
wherein the storage controller is adapted to couple with the initiator device and with the target device using Fibre Channel (FC) media and protocols,
wherein the sequence of related frames comprises a sequence of FC frames beginning with an FCP_CMND frame received from the initiator device and directed to the target device, and
wherein the content parsing circuit is further adapted to determine whether the fast-path I/O processor is capable of processing the FCP_CMND frame and is further adapted to route the FCP_CMND frame to the fast-path I/O processor responsive to a determination that the fast-path I/O processor is capable of processing the FCP_CMND frame and is further adapted to route the FCP_CMND frame to the soft-path I/O processor responsive to a determination that the fast-path I/O processor is not capable of processing the FCP_CMND frame.

5. The storage controller of claim 4
wherein the content parsing circuit is further adapted to update the routing information responsive to routing of the FCP_CMND frame, wherein the routing information comprises an exchange ID associated with the FCP_CMND frame and comprises indicia of whether FCP_CMND was routed to the fast-path I/O processor or to the soft-path I/O processor, and
wherein the content parsing circuit is further adapted, responsive to receipt of subsequent FC frames of the sequence of FC frames, to route each subsequent FC frame by locating a previously stored entry in the memory having an exchange ID matching an exchange ID in said each subsequent FC frame and forwarding said each subsequent FC frame to the soft-path I/O processor or to the fast-path I/O processor based on the indicia in the located entry.

6. The storage controller of claim 5
wherein the content parsing circuit is further adapted to update the routing information to route the subsequent FC frames to the soft-path I/O processor responsive to receipt of an FC frame indicating an error status in processing by the fast-path I/O processor.

7. The storage controller of claim 4
wherein the content parsing circuit is further adapted to update routing information responsive to receipt of the FCP_CMND frame, wherein the routing information comprises an FPORT identifier associated with the FCP_CMND frame and comprises indicia of whether the fast-path I/O processor or the soft-path I/O processor is processing the FCP_CMND frame, and
wherein the content parsing circuit is further adapted, responsive to receipt of subsequent FC frames of the sequence of FC frames, to route each subsequent FC frame by locating a previously stored entry in the memory having an FPORT identifier matching an FPORT identifier associated with said each subsequent FC frame and forwarding said each subsequent FC frame to the soft-path I/O processor or to the fast-path I/O processor based on the indicia in the located entry.

8. Apparatus in a storage controller of a storage system, the storage controller comprising multiple I/O processors, the storage controller adapted to couple with an initiator device using Fibre Channel (FC) media and protocols and adapted to couple with a target device using FC media and protocols, the apparatus comprising:
a content addressable memory (CAM) adapted to store routing information for routing of FC frames to one of the multiple I/O processors, the CAM adapted to generate an output signal based on the routing information responsive to receipt of an input signal;
a content parsing circuit coupled with the CAM and coupled to receive an I/O request comprising a sequence of FC frames, the sequence of FC frames including an initial FCP_CMND frame followed by one or more subsequent related FC frames, the content parsing circuit adapted to generate a tag value based on information associated with an FC frame of the sequence of FC frames, the content parsing circuit further adapted to apply the generated tag value as an input signal to the CAM to locate routing information in the CAM based on the generated tag value; and
a routing circuit coupled with the multiple I/O processors and coupled with the CAM, the routing circuit adapted to route an FC frame to a selected one of the multiple I/O processors based on an output signal received from the CAM,
wherein the apparatus is operable to route an FC frame to a selected one of the multiple I/O processors concurrently with reception of the FC frame.

9. The apparatus of claim 8
wherein the apparatus is integrated within circuits of one of the multiple I/O processors.

10. The apparatus of claim 8 further comprising:
wherein the routing circuit further comprises:
a queue comprising a plurality of entries, each entry of the queue adapted to store information identifying a received FC frame and identifying a selected I/O processor of the multiple I/O processors to which the FC frame is to be routed,
wherein the routing circuit is further adapted to route an FC frame by storing information in an available entry of the queue, the stored information identifying the FC frame and identifying the selected I/O processor to which the frame is to be routed,
wherein the routing circuit is further adapted to retrieve an entry from the queue with previously stored information and is further adapted to apply a signal to the selected I/O processor identified in the retrieved entry, and wherein the I/O processor processes the FC frame responsive to receipt of the signal.

11. The apparatus of claim 8 wherein the routing circuit is further adapted to associate an exchange ID (X_ID) with the FCP_CMND frame, wherein the routing circuit is further adapted to associate the X_ID of the FCP_CMND with the selected I/O processor to which the FCP_CMND frame is to be routed, and wherein the routing circuit is further adapted to route the one or more subsequent related FC frames that comprise the same I/O request as the FCP_CMND frame to the selected I/O processor associated with the X_ID.

12. The apparatus of claim 11 wherein the routing circuit is further adapted to modify the selection of the I/O processor associated with the X_ID responsive to sensing an error status in one of the one or more subsequent related FC frames that comprise the same I/O request as the FCP_CMND frame.

13. The apparatus of claim 12 wherein the routing circuit is further adapted to route the FCP_CMND frame to a fast-path I/O processor of the multiple I/O processors responsive to determining that the FCP_CMND frame comprises a read or write command, and wherein the routing circuit is further adapted to modify the selection of the I/O processor associated with the X_ID to route the one or more subsequent related FC frames to a soft-path I/O processor of the multiple I/O processors responsive to sensing the error status.

14. A method operable in a storage controller of a storage system, the storage controller comprising multiple I/O processors and a content parsing and routing logic circuit coupled with the multiple I/O processors, the method comprising:

receiving, in the logic circuit, an initial frame of a sequence of related frames that comprise an I/O request;

parsing, in the logic circuit, the initial frame concurrent with reception of the initial frame;

selecting, by operation of the logic circuit, an I/O processor of the multiple I/O processors based on information parsed from the initial frame;

routing, by operation of the logic circuit, the initial frame to the selected I/O processor;

storing in a memory coupled with the logic circuit, routing information indicating that the initial frame and any subsequent frames of the sequence of related frames are routed to the selected I/O processor;

routing, by operation of the logic circuit, subsequent frames of the sequence of related frames to the selected I/O processor based on the routing information stored in the memory; and processing, by operation of the selected I/O processor, the sequence of related frames to perform the I/O request.

15. The method of claim 14 wherein the multiple I/O processors comprise a fast-path I/O processor and a soft-path I/O processor, wherein the step of selecting further comprises selecting the fast-path I/O processor when the initial frame comprises a read or write command, the method further comprising:

parsing, in the logic circuit, the subsequent frames to determine whether an error was encountered in processing the read or write command by the fast-path I/O processor; and updating, by operation of the logic circuit, the routing information to route subsequent frames of the sequence of related frames to the soft-path I/O processor responsive to a determination that an error was encountered in processing the read or write command by the fast-path I/O processor.

16. The method of claim 15 wherein the storage controller is adapted to couple with a Fibre Channel (FC) initiator and adapted to couple with an FC target devices, wherein the initial frame is an FCP_CMND and the subsequent frames are FC frames, wherein an exchange ID (X_ID) is associated with the FCP_CMND and with the FC frames, wherein the step of storing further comprises:

storing routing information wherein the routing information associates an exchange ID (X_ID) with the FCP_CMND frame and associates the selected I/O processor with the X_ID.

17. The method of claim 16 wherein the step of routing subsequent frames further comprises:

routing the subsequent frames to the selected I/O processor associated with an

X_ID in each subsequent frame based on the routing information stored in the memory.

* * * * *